United States Patent [19]

Ojima

[11] Patent Number: 5,004,449
[45] Date of Patent: Apr. 2, 1991

[54] SEALED TENSIONER

[75] Inventor: Juji Ojima, Aikawa, Japan

[73] Assignee: NHK Spring Co., Ltd., Yokohama, Japan

[21] Appl. No.: 451,159

[22] Filed: Dec. 15, 1989

[30] Foreign Application Priority Data

Dec. 30, 1988 [JP] Japan .................................. 63-331596
Dec. 7, 1989 [JP] Japan ..................................... 1-318349

[51] Int. Cl.⁵ ................................................. F16H 7/12
[52] U.S. Cl. ..................................... 474/138; 474/135; 474/115; 220/367; 222/546; 222/563
[58] Field of Search ............... 220/232, 233, 237, 243, 220/244, 306, 307, 352, 353, 354, 360, 361, 367; 474/138, 115, 117, 135, 136, 111, 273; 222/546, 563, 521, 514, 517, 534, 544, 547, 556

[56] References Cited

U.S. PATENT DOCUMENTS

| 2,656,067 | 10/1953 | Mitchell | 220/367 |
| 3,432,087 | 3/1969 | Costello | 220/367 |
| 4,702,726 | 10/1987 | Ojima et al. | 474/138 |

FOREIGN PATENT DOCUMENTS 2200429  8/1988  United Kingdom ................ 474/135

Primary Examiner—Ramon S. Britts
Assistant Examiner—Roger J. Schoeppel
Attorney, Agent, or Firm—Fleit, Jacobson, Cohn, Price, Holman & Stern

[57] ABSTRACT

In a tensioner in which a tension rod advances from the casing to apply a tension to a chain or timing belt, the advancement of the rod is locked by inserting a pin into a penetrated hole formed at the drawing out portion of the rod. The penetrated hole is sealed to prevent the loss of lubricating oil when the pin is removed.

5 Claims, 4 Drawing Sheets 5,004,449

SEALED TENSIONER

BACKGROUND OF THE INVENTION

This invention relates to a tensioner which provides a fixed tension to a chain or timing belt which drives a cam shaft of an engine of a car.

The tensioner is generally used as a chain or a belt tensioner to an engine. The tensioner operates to push the chain or the belt in a certain direction directly or indirectly so as to maintain a fixed tension when the chain or the belt extends and slackens by friction.

Such tensioner is adapted to insert into a casing by screwing the rotary body and an urged body to energize the rotation of the rotary body with a spring force and change the rotation force of this rotary body to a propelling force of the urged body to advance the urged body from the casing. The top end of the urged body always urges the chain or the like, thereby maintaining a fixed tension.

FIG. 8 shows a traditional example of this tensioner wherein a rotary body 3 and an urged body 4 are inserted into a cavity 2 formed in a casing 1 in a screwed state and a torsion spring 5 is outwardly inserted into the rotary body 3. The screwing of the rotary body 3 with the urged body is performed by providing a male portion 3a at the top end side (left side) of the rotary body 3, while providing a female portion 4a at the inner surface of the urged body 4. The urged body 4 is inserted through an opening in urged body 4. The urged body 4 is inserted through an opening in a bearing 6 which is prevented from being withdrawn by a circlip inserted into the top end portion of the casing 1, and rotation of the urged body 4 is prevented by making it and the bearing opening non-circular. Further, one end 5a of the spring 5 inserted outwardly through the rotary body 3 is inserted into a long groove 1a and the opposite end (not shown) is inserted into the rotary body 3, thereby energizing the rotation of the rotary body 3. In such a construction, the rotary body 3 rotates by the spring force, and this rotation force is transmitted to the urged body 4 screwed with the rotary body 3. In this case, since the rotation of the urged body 4 is restrained by the bearing 6, the rotative force thereof is changed to a propelling force to advance the urged body 4 is restrained by the bearing 6, the rotative force thereof is changed to a propelling force to advance the urged body 4 from the casing. Since the top end portion of the urged body 4 abuts against the chain or the belt (not shown) directly or indirectly, this member is maintained at a fixed tension by the advancement of the urged body 4. The inner cavity of such tensioner is sealed and a lubricant oil is sealed therein, thereby providing a smooth operation. This closely sealed construction will be described as follows.

The numeral 8 is a seal bolt screwed with the base portion (right portion) of the casing 1, said seal bolt engaging a seal ring 9 and a washer 10 thereby sealing off the base portion of the casing 1. On the other hand, a cap 11 is inserted at the top end portion of the urged body 4 and a boot 12 is bridged between the cap 11 and the casing 1 for covering them whereby the sealing of the top end portion of the casing is performed. Accordingly, the casing 1 is closely sealed by the seal bolt 8 and the boot 12.

In such a tensioner, the spring 5 is twisted to store energy at the time of assembly. At the time of maintenance and the conveyance before assembling of the device, there necessitates the locking of the rotation of the rotary body 3 against the energy of the spring 5. For this purpose, there is provided a stopper mechanism which performs a locking of the rotation. The stopper mechanism is provided by a stopper hole 13 formed in the base side of the casing in a right angular direction to the axial direction, and a pin shaped stopper member 14 inserted into the stopper hole 13. A slit 15 to be engaged by a winding or clamping tool (not shown) such as a screwdriver is formed at the base of the rotary body 3. The slit 15 is used for winding the spring at the time of assembling the tensioner. In other words, the winding of the spring 5 is performed by inserting the tool from the base portion side of the casing 1 in a removed state of the seal bolt 8, and by rotating the rotary body 3 by engaging the top end of the tool with the slit 15 of the rotary body 3.

After winding the spring 5, locking of the rotation of the rotary body 3 against the spring force of the spring 5 is performed by inserting the stopper member 14 into the stopper hole 13 of the casing 1 and a slit 15 of the rotary body 3. Further, after assembling the tensioner to the device, the rotary body 3 rotates by the spring force by pulling out the stopper member 14, thereby to maintain tension of the chain or the belt caused by the advancement of the urged body 4.

However, the stopper mechanism of the known tensioner is only for locking the rotary body 3 against rotation. Accordingly, this mechanism is composed only of the stopper member 14 which fits into the stopper hole 13 of the casing 1. In such a construction, not only at the time of operation of the tensioner wherein the stopper member 14 is drawn out from the stopper hole 13, but also in a state wherein the stopper member 14 is inserted into the stopper hole 13, the lubricant oil is apt to leak from the stopper hole. The amount of leakage increases with vibration of the tensioner during conveyance of the tensioner or in maintenance thereof. The leakage of the lubricant oil decreases the smoothness of operation of the tensioner.

The object of this invention, therefore, is to prevent the leakage of the lubricant oil not only at the time of the operation of the tensioner, but also during conveyance or maintenance and to provide a tensioner which has enhanced lubrication.

SUMMARY OF THE INVENTION

In order to achieve the above object, this invention is characterized in that in a tensioner wherein the rotary body and the urged body are provided in the casing in a screwed state and the urged body advances in an axial direction by the rotation of the rotary body with a spring force, said tensioner being provided with a stopper hole formed at the rotary body and the casing, and a stopper member which locks the rotation of the rotary body by being inserted into the stopper hole, a resilient sealing member is provided in the stopper hole. A guide hole having a hole diameter which is suitable to prevent the leakage of the lubricant oil from the casing and to allow penetration of the stopper member, is formed in the sealing member.

Further, the guide hole may be of a smaller diameter than the outer diameter of the stopper member.

The sealing member is inserted into the stopper hole thereby sealing the stopper hole in both the inserted state of the stopper member and in the non-inserted state thereof. The guide hole of the sealing member has a diameter which substantially prevents the leakage of the lubricant oil in the non-inserted state of the stopper member and further, on insertion of the stopper member the sealing member closely contacts the outside of the stopper member and is somewhat extended in the inserting direction due to the elasticity thereof thereby sealing around the inserted portion of the stopper member.

Furthermore, the stopper member is inserted into the penetrated hole of the sealing member by penetrating it with the stopper member. When the stopper member is not inserted therein, the above projected position is closed by the restoring force of the elastic body to close the guide hole.

DETAILED DESCRIPTION OF THIS INVENTION

Figure 1:
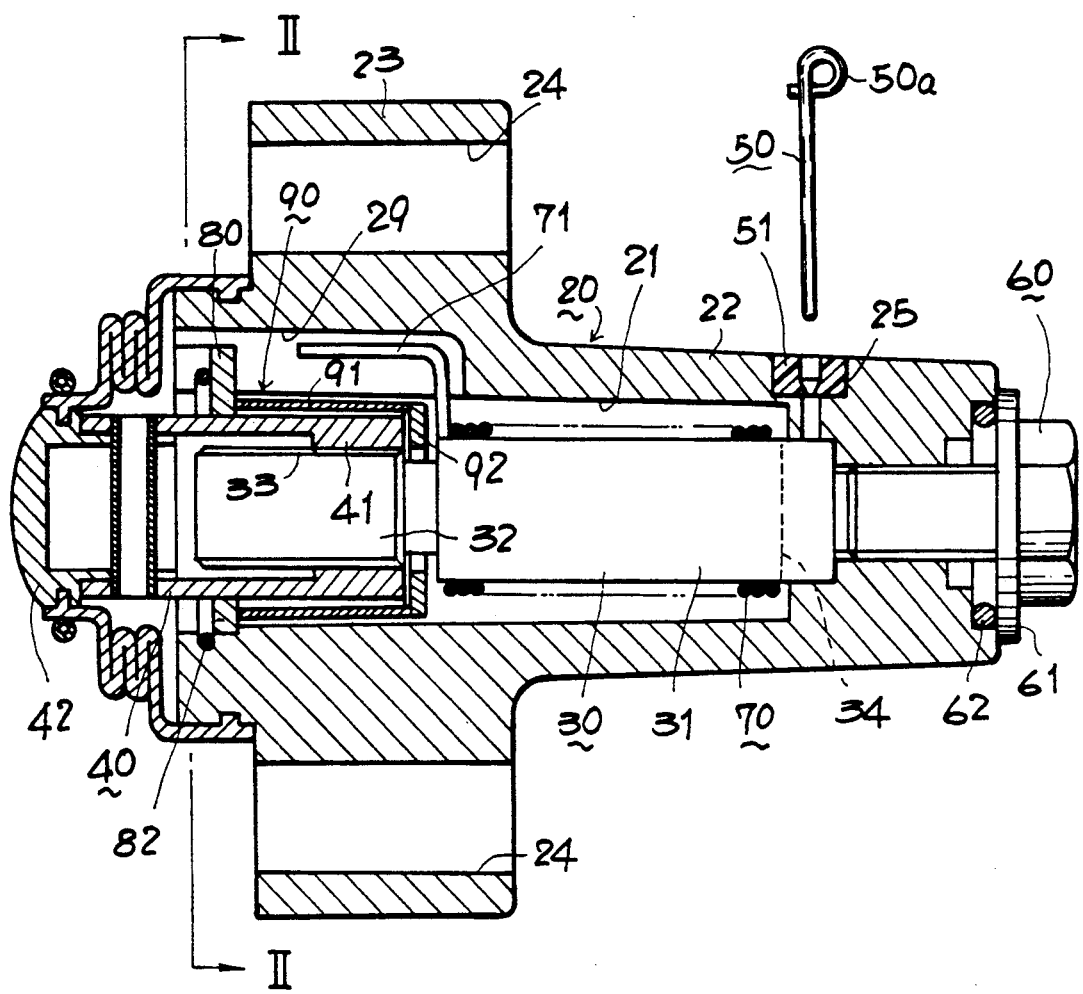
FIG. 1 and FIG. 2 represent a longitudinal sectional view of a tensioner and a sectional view taken on line II—II respectively.
Figure 2:
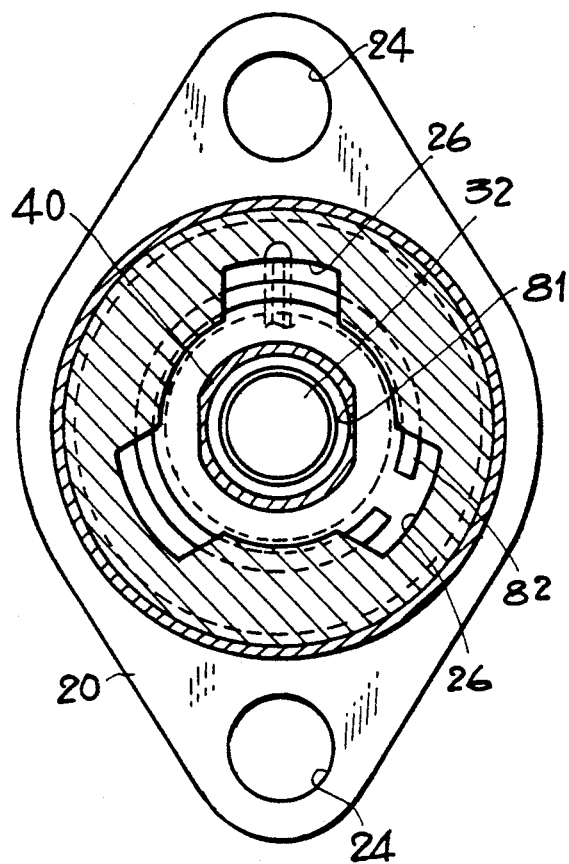
Figure 4:
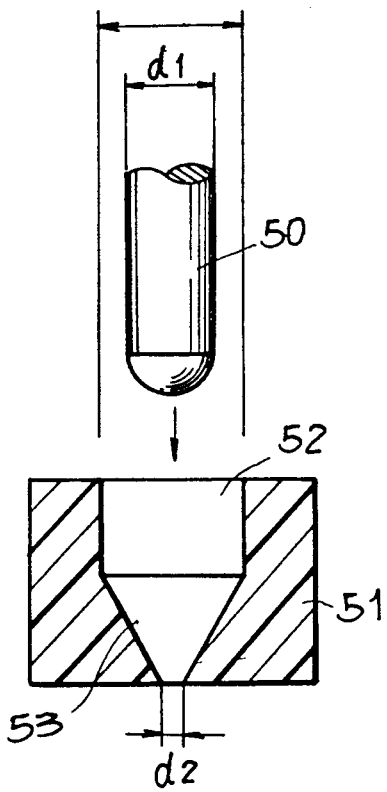
FIG. 3, FIG. 4 and FIG. 5 represent a partially enlarged view of a part of the tensioner and exploded sectional views which show a sealing state of the seal element and stopper and FIG. 6.
Figure 3:
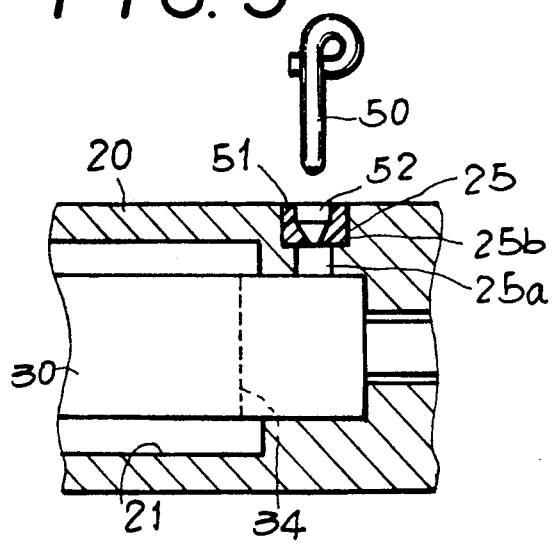

Now, referring to the longitudinal sectional view in FIG. 1 and the sectional view taken in line—shown in FIG. 2, an example of a tensioner according to the invention will be described as follows.

This tensioner is provided with a casing 20 formed in internal cavity 21 extending in an axial direction, a shaft-like rotary body 30 inserted into the cavity 21 of the casing, a cylindrical urged 40 screwed to the top end portion of the rotary body 30, a seal bolt 60 attached to the base portion (right end portion shown in the example) of the casing 20, a torsion spring 70 which rotates body 30, a bearing 80 which supports the urged body 40, and a stopper member 50 which locks the rotation of the rotary body 30.

The casing 20 comprises a horizontally long cylindrical portion 22 and a flange portion 23 continuously connected to the top end side of the cylindrical portion 22. Attachment holes 24 are provided in upper and lower portions of the flange portion 23, for fixing the casing to the outer wall of a device (not shown) such as an engine or the like, with bolts. During assembly of the tensioner, the top end side of the cylindrical portion 22 of the casing 20 (left side in FIG. 1) and the base portion (right side in FIG. 1) are both opened.

The rotation shaft 30, the urged body and the torsion spring 70 are inserted from the left side, while a seal bolt 60 is attached to the right side of the casing.

The rotary body 30 consists of a large diameter portion 31 and a small diameter portion 32, said large diameter portion 31 having a torsion spring 70 thereon and the small diameter portion 32 being screwed to the urged body 40. The screwing of the urged body 40 to the small diameter portion 32 is performed by screwing a male screw portion provided at the outer circumferential surface of the small diameter 32 with a female screw portion 41 provided at the inner circumferential surface of the urged body 40. Further, at the base end portion of the large diameter portion 31 is bored a latching groove 34 in a direction which intersects with an axial direction of the rotary body 30, and one end of the torsion spring 70 (not shown) is inserted into the latching groove 34. The latching groove also functions as a stopper groove which locks the rotation of the rotary body by receiving a stopper member 50 as described hereafter. The opposite end of the torsion spring 71 is bent to the shape of an L so that it may extend in the direction of the top end portion. A long groove 29 in which end 71 of the torsion spring is inserted is formed within casing 20. When the tensioner is assembled in a state where a fixed torque is provided by screwing the torsion spring 70, the rotary body 30 is adapted to rotate by the restoration force of the torsion spring 70.

The urged body 40 is inserted into cavity 21 of the casing 20 in a state where the urged body is screwed with a small diameter portion 32 of the rotary body 30 and the intermediate portion is supported by a bearing 80.

The bearing 80 is inserted from the opening portion at the top end of the casing 20 and the outer circumferential portion formed at the top end opening portion. Further, the bearing with an internal hole 81 having an approximately elliptical shape and the shape of the outer circumference of the urged body 40 is formed to be the same shape as the internal hole, thereby restraining the rotation of the urged body by inserting it into the hole 81. Accordingly, if the rotary body rotates, the urged body does not rotate, but the urged body 40 is adapted to slide by the change of the rotation force to propelling force of the urged body 40. The slide of the urged body projects the urged body to the outward of the casing 20.

Further, when the rotary body 30 is reversed against the torsion spring 70, the urged body is returned within the casing 20 and is able to reset it. A spacer 90 has a cylindrical portion 91 surrounding the urged body 40 and a washer portion 92 continuously connected at the inside of the cylindrical portion 91 from the base end portion thereof. The washer portion 92 is positioned between the large diameter portion 31 and the small diameter portion 32 of the rotary body thereby restraining sliding to the left of the rotary body 30 noting that cylindrical portion 91 engages bearing 80. Further, the numeral 82 is a circlip which prevents the bearing 80 from falling out.

The top end portion of the urged body 40 is covered with a cap 42 abutting against a chain, belt or the like directly or indirectly to urge it to a fixed direction, thereby correcting the slackness of the chain or the belt.

Further, when a large anti-reaction force acts on the large diameter portion 25b of the stopper hole 25. The sealing member 51 is made of elastic material such as rubber, plastic or the like, the outer diameter thereof being equal to the inner diameter of a large diameter 25b of the stopper hole or somewhat larger than that and being larger than the small diameter portion 25a of the stopper hole 25. Accordingly, when the sealing member 51 is inserted into the stopper hole, the sealing member 51 is supported by the shoulder portion of the stopper hole 25 which has a stepped configuration. The sealing member 51 is provided with an insertion hole 52 which penetrates the sealing member in a vertical direction, and into which the stopper member 50 is inserted. The insertion hole 52 is provided continuously with a guide portion 53 having a part-conical shape which becomes smaller in diameter toward its lower end and the stopper member 50 is inserted through the guide hole 53. The dimensional relation between the stopper member 50 and the guide hole 53 is such that diameter $d_2$ of the lower end opening portion of the guide hole 53 may be smaller than the outer diameter $d_1$ of the stopper member 50 so as to prevent the leakage of the lubricant oil. The sealing member 51 having such construction can prevent the oil leakage from the guide hole 53 even in a state wherein the stopper member is not inserted therein, and when the stopper member 50 is inserted into sealing member 51 having such construction, a seal effect due to the sealing member 51 occurs.

Figure 5:
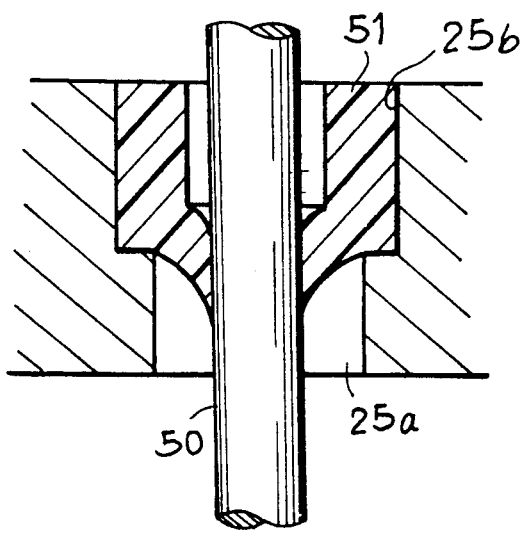
Figure 7:
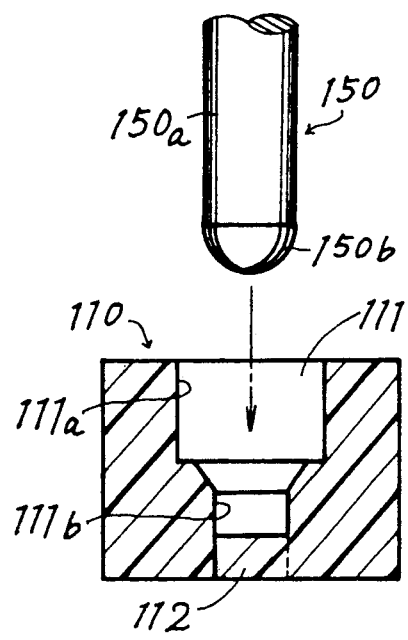
FIG. 7(a) and FIG. 7(b) are exploded sectional views of other forms of seal elements and stopper members.

FIG. 5 shows the sealing state. The guide hole portion 53 having a small hole diameter of the sealing member 51 is expanded in the inserting direction of the stopper member 51 due to the elasticity thereof by the insertion of the stopper member 50 to extend to the inner end of the stopper hole 25a thereby closely attaching to the outer surface of the stopper member 50. In this case, since the sealing member 51 is supported by the shoulder part of the stopper hole 25, the stopper member 50 is prevented from falling down into the small diameter portion 25a of the stopper hole 25 and maintains a good sealing state.

Accordingly, in such a construction the inserting portion of the sealing member 51 is closely sealed by the sealing element 51 whereby the lubricant oil within the casing 20 does not leak even during vibration at the time of conveyance, and even during maintenance so that there occurs no decrease of the lubricative effect due to shortage of lubricant oil. Further, although the sealing member 51 in the above example is supported by the shoulder part of the stopper hole 25 having a stepwise stopper hole construction, a construction wherein the sealing member 51 to the inner surface of the stopper hole 25 may be used. In this case, the boring of the stopper hole 25 becomes easy.

Assembly of the tensioner constructed as described above, is performed by inserting the torsion spring 70 into the cavity 21 from the opening portion at the top end side of the casing 20, inserting the rotary body 30 and the urged body 40 together with the spacer 90 in an assembled stated, inserting the bearing 80 around the urged body 40 and fixing same by the circlip 82, and then attaching the cap 42 to the urged body 40.

Further, a screwdriver or the like is inserted into the latching groove 34 of the rotary body 30 from the opening side of the base end of the casing 20 to rotate the rotary body 30 thereby providing the rotation torque to the torsion spring, and further the stopper member 50 is inserted into the sealing member 51 attached to the stopper hole 25 and inserts the top end thereof into the latching groove 34 of the rotary body 30 thereby performing the locking of the rotation of rotary body 30. Then, the O-ring 62 and the seal bolt 60 are attached to the opening portion of the base end of the casing. The top end portion of the casing is inserted into the device of an engine or the like in this state to fix the flange portion 23 to the device and the stopper member 50 is removed. This causes the rotary body 30 to be rotated by the torque of the torsion spring 70 whereby the urged body 40 advances from the casing to press against the chain, belt or the like.

Figure 6:
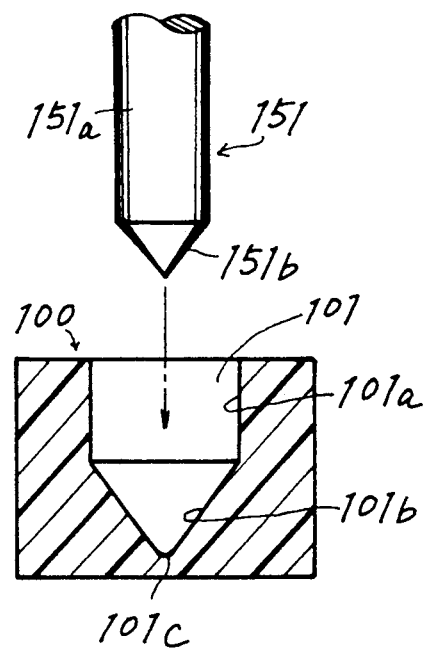
Figure 7:
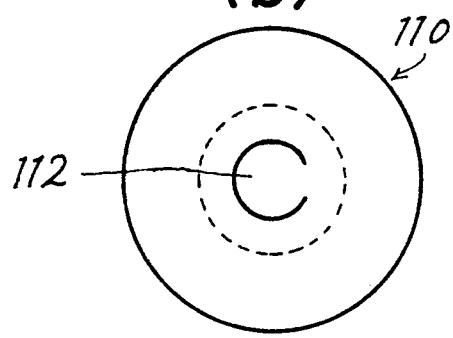
Figure 8:
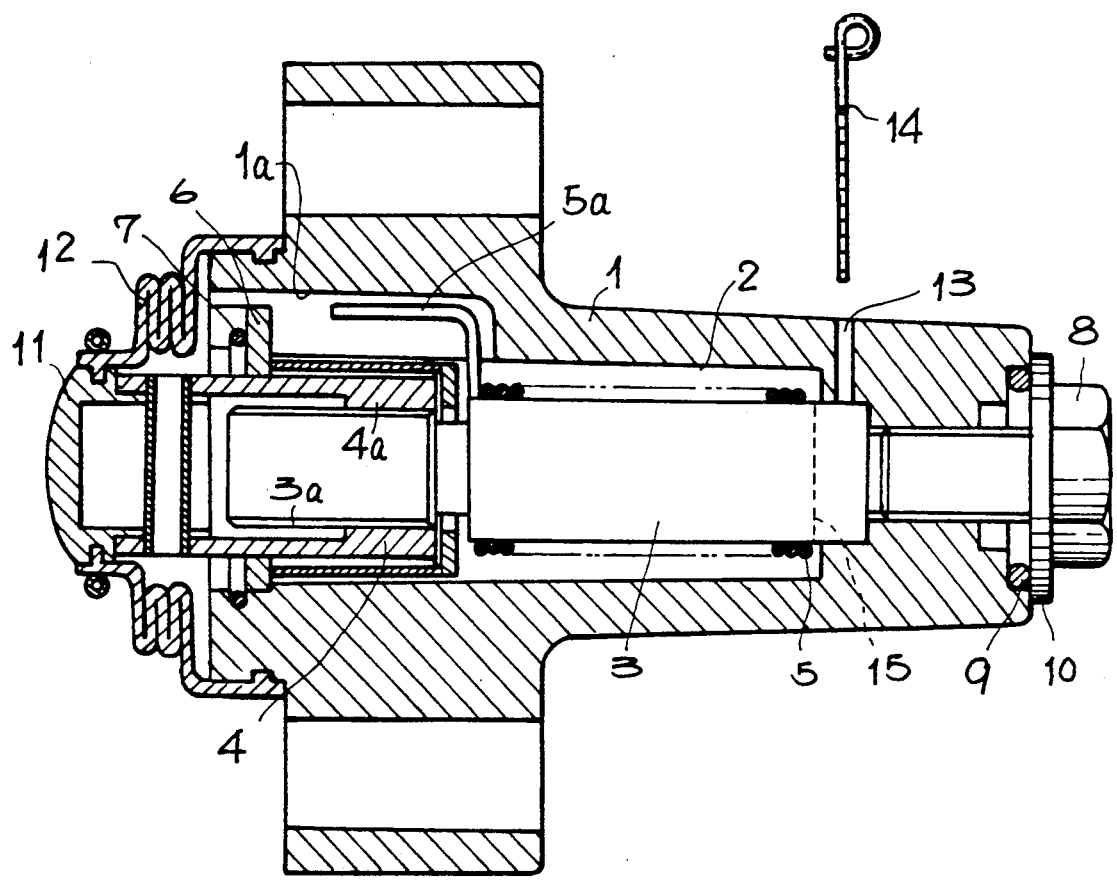
FIG. 8 is a longitudinal sectional view of a traditional device.

FIG. 6 shows another embodiment of the attached construction of the stopper member.

The sealing member 100 shown in FIG. 6 is formed by the same shape and material as member 51 described above, and a penetrated hole 101 into which the stopper member 151 is inserted is formed. The penetrated hole 101 consists of a cylindrical portion 101a which opens upward and a guide portion 101b having a reverse conical shape continuously connects to the lower portion of the cylindrical portion 101a. The bottom portion 101c of the guide portion 101b is closed by a film layer of the sealing member 100 without opening.

On the other hand, the stopper member 151 is provided with a main body 151a having a smaller diameter than that of the cylindrical portion 101 of the sealing member and a tip top portion 151b provided at the lower end of the main body 151a.

The stopper 151 is inserted into the penetrated hole 101 of the sealing portion, the end portion 151b thereof advancing by braking the bottom 101c of the guide portion, whereby the stopper member 151 is inserted into the sealing member 100.

In this inserting state, the sealing member 100 is closely contacted to the outer periphery of the stopper member 151, whereby the inserting portion of the stopper member 151 is sealed. Further, when in a non-inserting state wherein the stopper member 151 is removed the inserting portion of the stopper member 151 is closed by the restoration to the original state due to the elasticity of the sealing member 100.

The sealing members 100 (FIG. 6) close the stopper hole 25 (FIG. 1) at the time of inserting and non-inserting of the stopper member 151, thereby preventing the leakage of the lubricant oil in the casing.

In this invention described above, since the sealing member having a smaller guide hole than that of the stopper member is attached to the inserting portion of the stopper member which performs the locking of the rotary body, a good sealing effect can be obtained whereby the leakage of the lubricant oil in the casing can be prevented at the time of conveyance and of the maintenance of the tensioner.

What I claim is:

1. A tensioner device comprising a casing, a rotary body in the casing, a tensioner body in the casing having a threaded connection with the rotary body whereby rotation of the rotary body provides translatory movement of the tensioner body relative to the casing, a spring mechanism within the casing for urging the rotary body to rotate in a direction moving the tensioning body outwardly relative to the casing and a locking mechanism for selectively holding the rotary body against rotation by the spring mechanism, the locking mechanism comprising a pin hole in the casing, a locking pin received in said hole for releasable arresting engagement with the rotary body, and a seal element of resilient material in the pin hole, the seal element having an outer peripheral surface in sealing engagement with a wall surface of the pin hole, the seal element further having a throughbore defining an inner peripheral surface, the locking pin being received in said throughbore and said inner surface being in sealing engagement around the locking pin for preventing egress of fluid from the casing through the pin hole.

2. A device as claimed in claim 1 wherein the throughbore in said seal element has a smaller diameter portion defining said inner peripheral surface and a larger diameter portion adjacent the smaller diameter portion with clearance between the pin and the larger diameter portion.

3. A device as claimed in claim 2 wherein said throughbore has a frusto-conical portion which connects said smaller diameter portion to said larger diameter portion.

4. A device as claimed in claim 1 wherein the rotary body has a slot for receiving the locking pin and also for receiving a screwdriver when the locking pin is removed for winding up the spring mechanism.

5. A device as claimed in claim 1 wherein the pin hole has a smaller diameter inner portion, a larger diameter outer portion, and a shoulder between said portions, the seal member being received in said larger portion under resilient radial compression and engaging against said shoulder.

* * * * *